United States Patent [19]

Yoshikawa et al.

[11] Patent Number: 5,623,000
[45] Date of Patent: Apr. 22, 1997

[54] PRESSURE-SENSITIVE ADHESIVE HAVING EXCELLENT HEAT-RESISTANCE, ADHESIVE SHEET USING IT, AND METHOD FOR PRODUCING THOSE

[75] Inventors: Takao Yoshikawa; Takaaki Moriyama, both of Osaka, Japan

[73] Assignee: Nitto Denko Corporation, Osaka, Japan

[21] Appl. No.: 462,282

[22] Filed: Jun. 5, 1995

Related U.S. Application Data

[62] Division of Ser. No. 181,877, Jan. 13, 1994, Pat. No. 5,462,977, which is a continuation of Ser. No. 969,580, Oct. 30, 1992, abandoned.

[30] Foreign Application Priority Data

Oct. 31, 1991 [JP] Japan ..................... 3-313235

[51] Int. Cl.$^6$ ..................... C09J 7/02
[52] U.S. Cl. ..................... 522/16; 428/345; 428/355 AC; 522/63; 522/126; 522/182
[58] Field of Search ..................... 522/16, 63, 126, 522/167, 182; 428/343, 345, 354, 355; 427/208.4, 208.8

[56] References Cited

U.S. PATENT DOCUMENTS

| | | | |
|---|---|---|---|
| 4,181,752 | 1/1980 | Martens | 428/343 |
| 4,329,384 | 5/1982 | Vesley | 428/345 |
| 4,379,201 | 4/1983 | Heilmann | 428/345 |
| 4,404,246 | 9/1983 | Charbonneau | 428/352 |
| 4,731,273 | 3/1988 | Bonk | 428/355 |
| 4,751,269 | 6/1988 | Bonk | 428/355 |
| 4,818,610 | 4/1989 | Zimmerman | 428/355 |
| 4,965,127 | 10/1990 | Ebe | 428/345 |
| 4,968,558 | 11/1990 | Fisher | 428/355 |
| 5,028,484 | 7/1991 | Martin | 428/355 |
| 5,202,361 | 4/1993 | Zimmerman | 428/355 |
| 5,229,206 | 7/1993 | Groves | 428/343 |

FOREIGN PATENT DOCUMENTS 2-60981  8/1988  Japan.

*Primary Examiner*—Jenna Davis
*Attorney, Agent, or Firm*—Sughrue, Mion, Zinn, Macpeak & Seas

[57] ABSTRACT

A pressure-sensitive adhesive having excellent heat resistance, comprising a photopolymerization product of a composition comprising;

a) 100 parts by weight of a monomer mixture comprising from 70 to 100% by weight of a (meth)acrylic acid alkyl ester having from 2 to 14 carbon atom on the average in the alkyl moiety and from 30 to 0% by weight of a monoethylenically unsaturated monomer copolymerizable with the (meth)acrylic acid alkyl ester, b) from 0.02 to 5 parts by weight of a polyfunctional (meth)acrylate as a crosslinking agent, and c) from 0.01 to 4 parts by weight of a photopolymerization initiator, wherein a content of the solvent-insoluble components is at least 60% by weight and a remaining amount of the unreacted monomers is less than 5,000 ppm.

11 Claims, No Drawings

PRESSURE-SENSITIVE ADHESIVE HAVING EXCELLENT HEAT-RESISTANCE, ADHESIVE SHEET USING IT, AND METHOD FOR PRODUCING THOSE

This is a divisional of application Ser. No. 08/181,877 filed Jan. 13, 1994, now U.S. Pat. No. 5,462,977, which is a continuation of 07/969,580, filed Oct. 30, 1992, now abandoned.

FIELD OF THE INVENTION

The present invention relates to an acrylic pressure-sensitive adhesive having excellent heat resistance, which can be used at high temperatures of 100° C. or higher and can be used in a soldering step; an adhesive sheet formed by applying the adhesive on one surface or both surfaces of a sheet-form or tape-form backing; and also methods for producing the pressure-sensitive adhesive and the adhesive sheet.

BACKGROUND OF THE INVENTION

Acrylic pressure-sensitive adhesives have excellent tackiness, cohesive force, aging resistance, etc., and have been wisely used. In particular, the demand has recently increased for pressure-sensitive adhesives having high heat resistance as a fixing tape for adhering parts or as masking tape in a soldering step when assembling electronic parts, etc.

An acrylic pressure-sensitive adhesive is generally prepared by copolymerizing an acrylic acid alkyl ester having from 2 to 14 carbon atoms in the alkyl moiety as the main component. If necessary, a small amount of a polar monomer such as acrylic acid, etc., together with monomer component(s) giving a high glass transition temperature, such as styrene, vinyl acetate, etc., for well-balancing the releasing characteristics, tack, etc. Also, for improving the heat resistance and the cohesive force, the adhesive can be crosslinked.

During the production of such an acrylic pressure-sensitive adhesive, usually, after solution polymerizing a monomer in an organic solvent, the polymer formed is compounded with a tackifying resin, a crosslinking agent, etc., to provide an adhesive composition, and after coating the composition on a backing, a large amount of organic solvent is removed by heating to provide a sheet-form or tape-form adhesive sheet.

However, in this generally used method, because of the occurrence of chain transfer into the organic solvent during polymerization, the average molecular weight of the polymer formed is at most about 1,000,000. If the polymer is not crosslinked, the adhesive obtained has an insufficient holding property and even if the polymer is crosslinked, the cohesive force is lowered and holding property is greatly lowered at high temperatures of 100° C. or more. Accordingly, when the adhesive is used in a fixing tape or a masking tape during a soldering step, the problem of slipping and oozing of the adhesive can occur. Also, the low boiling organic solvent used in the production of the adhesive remains, but the remaining solvent is vaporized and expanded at a high temperature to cause the problems of the occurrences of foaming, swelling, slipping, etc., at the adhered surface and also corrosion of electronic parts with the vaporized gas.

On the other hand, recently, from the viewpoint of safety and environmental sanitation caused by the use of organic solvents, photopolymerization type adhesives have been proposed in acrylic pressure-sensitive adhesives. For example, U.S. Pat. No. 4,181,752 discloses a method of obtaining a pressure-sensitive adhesive without using an organic solvent by photo-polymerizing an acrylic acid alkyl ester and a monoethylenically unsaturated monomer on a backing. Also, it is known that a transfer type pressure-sensitive adhesive, which is the same type of adhesive described above, is first formed on a release liner and then transferred onto a backing.

By using the above photopolymerization type adhesives, the above-described various problems caused by the use of organic solvents are wholly overcome and also it is expected that by irradiating the monomer components with light having a relatively weak intensity, the molecular weight of the polymer can be increased and a pressure-sensitive adhesive having a high degree of crosslinking and a large cohesive force is obtained.

However, in the conventional photopolymerization type pressure-sensitive adhesives, since the photopolymerization is carried out in a completely bulk state, the polymerization rate is not 100% by no means and few percent by weight of the unreacted monomers remain. The unreacted monomers thus remaining not only cause a bad smell but also act as a plasticizer of the adhesive that greatly lowers the cohesive force at high temperatures; causes swelling of the adhered surface by the vaporization of the monomers at high temperatures, and causes stains by the gas, all which inhibit the use of the adhesive for heat resistance uses.

For reducing the amount of unreacted monomers, it has been considered to improve the polymerization rate by using a large amount of a photopolymerization initiator, but in such a case, the molecular weight of the polymer formed is lowered with the increase of the initiation radical concentration. As a result, the cohesive force of the adhesive at a high temperature is lowered and a high heat resistance, which is desired in a soldering step, etc., has not yet been attained.

Furthermore, JP-A-2-60981 (the term "JP-A" as used herein means an "unexamined published Japanese patent application") proposes that in a method of producing a pressure-sensitive adhesive tape by a photopolymerization, the photopolymerization is carried out in two separate stages to reduce the amount of residual monomers by improving the photopolymerization rate and improving the productivity.

However, in the above method, to consume the residual monomers in the 2nd stage, it is necessary to irradiate the polymer formed in the 1st stage with light having a higher intensity than light used in the 1st stage, the formation of low molecular weight materials is inevitable in the 2nd stage. Hence although the additive obtained has a heat resistance of about 100° C., in a soldering heat-resistance use at a higher temperature, there are difficulties in forming prints and stains on the adhesive surface of the pressure-sensitive adhesive tape because of the bleeding of the low molecular weight materials peeling, slipping, falling, etc.

SUMMARY OF THE INVENTION

In view of the above-described problems in the conventional techniques, the object of the present invention is to provide a photopolymerization type acrylic pressure-sensitive adhesive capable of avoiding the occurrence of the problems caused by remaining unreacted monomers or by the formation of the low molecular weight materials and having a high heat resistance during the use at a temperature of higher than 100° C. and in particular, having an excellent heat resistance under a very high temperature of up to 260° C. as in the case of a soldering step.

As the result of intensive investigations to attain the above object, the inventors have found that in a photopolymerization type acrylic pressure-sensitive adhesive without the need of using a low boiling organic solvent, by employing a method of removing remaining monomers after the photopolymerization by heat-drying in place of reducing the unreacted monomers by improving the photopolymerization rate as the above-described conventional manner, a pressure-sensitive adhesive having a large cohesive force at a high temperature and an excellent heat resistance is obtained with a restrained formation of low molecular weight materials during at the photopolymerization. The inventors have succeeded in achieving the present invention based on this finding.

That is, according to one object of the present invention, there is provided a pressure-sensitive adhesive having excellent heat resistance comprising a photopolymerized product of a composition comprising;

a) 100 parts by weight of a monomer mixture comprising from 70 to 100% by weight of a (meth)acrylic acid alkyl ester having from 2 to 14 carbon atoms on the average in the alkyl moiety and from 30 to 0% by weight of a monoethylenically unsaturated ester copolymerizable with the (meth)acrylic acid alkyl ester, b) from 0.02 to 5 parts by weight of a polyfunctional (meth)acrylate as a crosslinking agent, and c) from 0.01 to 4 parts by weight of a photopolymerization initiator, wherein the solvent-insoluble components are at least 60% by weight and the remaining amount of the unreacted monomers is less than 5,000 ppm.

According to another object of the present invention, there is provided an adhesive sheet comprising a sheet-form or tape-form backing having formed one or both surfaces thereof a layer of the adhesive.

Also, according to still another object of the present invention, there is provided a method for producing a pressure-sensitive adhesive having excellent heat resistance, which comprises irradiating a composition comprising;

a) 100 parts by weight of a monomer mixture comprising from 70 to 100% by weight of a (meth)acrylic acid alkyl ester having from 2 to 14 carbon atoms on the average in the alkyl moiety and from 30 to 0% by weight of a monoethylenically unsaturated monomer copolymerizable with the (meth)acrylic acid alkyl ester, b) from 0.02 to 5 parts by weight of a polyfunctional (meth)acrylate as a crosslinking agent, and c) from 0.01 to 4 parts by weight of a photopolymerization initiator with ultraviolet rays to form a photopolymerization product containing solvent-insoluble components of at least 60% by weight, and drying the product by heating to reduce the content of the unreacted monomers to less than 5,000 ppm.

Furthermore, according to further object of the present invention, there is provided a method for producing an adhesive sheet, which comprises forming the layer of the pressure-sensitive adhesive produced by the above method on one or both surfaces of a sheet-form or tape-form backing.

DETAILED DESCRIPTION OF THE INVENTION

The (meth)acrylic acid alkyl ester used in the composition of the present invention is the main component of the monomer mixture as component a). A monofunctional unsaturated (meth)acrylate of a non-tertiary alkyl alcohol is preferably used as the (meth)acrylic acid alkyl ester, and the alkyl moiety thereof has from 2 to 14 carbon atoms. Examples of such a monomer are ethyl (meth)acrylate, butyl (meth)acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate, and dodecyl (meth)acrylate, and these monomers can be used alone or as a mixture thereof.

The monoethylenically unsaturated monomer copolymerizable with the (meth)acrylic acid alkyl ester is used to improve the adhesive property of the adhesive formed by the introduction of a functional group or a polar group or to control the glass transition temperature of the copolymer formed to thereby improve and modify the cohesive force and the heat resistance, by copolymerizing the same with the (meth)acrylic acid alkyl ester.

Examples of the monomer include acrylic acid, itaconic acid, sulfopropyl acrylate, a hydroxyalkyl acrylate, a cyanoalkyl acrylate, acrylamide, a substituted acrylamide, N-vinylcaprolactam, acrylonitrile, 2-methoxyethyl acrylate, glycidyl acrylate, vinyl acetate, and the like. These monomers are used alone or as a mixture thereof according to the purpose.

As the mixing ratio of these monomers of the monomer mixture comprising the (meth)acrylic acid alkyl ester and the monoethylenically unsaturated monomer copolymerizable with thereof, it is desirable that the content of the (meth)acrylic acid alkyl ester as the main component is from 70 to 100% by weight, and preferably from 85 to 95% by weight, and the content of the monoethylenically unsaturated monomer copolymerizable with the main component monomer is from 30 to 0% by weight, and preferably from 15 to 5% by weight. By using these monomers in the above-described range, the adhesive property, the cohesive force, etc., of the adhesive obtained can be well-balanced.

The composition of the present invention contains a small amount of a polyfunctional (meth)acrylate which is a crosslinking agent, as component b). Examples of the polyfunctional (meth)acrylate are trimethylolpropane tri(meth)acrylate, pentaerythritol tetra(meth)acrylate, 1,2-ethyleneglycol di(meth)acrylate, 1,6-hexanediol di(meth)acrylate, and the like.

The polyfunctional (meth)acrylate is used in an amount of from 0.02 to 5 parts by weight, and preferably from 0.1 to 3 parts by weight, per 100 parts by weight of the monomer mixture as component a). In the case of a difunctional (meth)acrylate, the amount thereof may be large within the above-described range, and in the case of a trifunctional or higher functional (meth)acrylate, the amount thereof may be small within the above-described case. However, if the amount of the polyfunctional (meth)acrylate is less than 0.02 part by weight, the degree of crosslinking after the photopolymerization cannot be sufficiently increased, while if the amount of the polyfunctional (meth)acrylate is more than 5 parts by weight, there is a possibility of lowering the adhesive power of the adhesive obtained. Thus, the amount outside the above-described range is undesirable in this invention.

Examples of the photopolymerization initiator used in the composition of this invention as component c) are benzoin ethers such as benzoin methyl ether, benzoin isopropyl ether, etc.; substituted benzoin ethers such as anisoin methyl ether, etc.; substituted acetophenones such as 2,2-diethoxyacetophenone, 2,2-dimethoxy-2-phenonacetophenone, etc., substituted α-ketols such as 2-methyl-2-hydroxypropiophenone, etc.; aromatic sulfonyl chlorides such as 2-naphthalenesulfonyl chloride, etc.; and photoactive oximes such as 1-phenone-1,1-propanedione-1-(o-ethoxycarbonyl)oxime, etc.; and the like.

The photopolymerization initiator is used in an amount of from 0.01 to 4 parts by weight, and preferably from 0.05 to 1 part by weight, per 100 parts by weight of the monomer mixture as component a). If the amount of the photopolymerization initiator is less than 0.01 part by weight, a large amount of monomers is liable to remain, while the amount thereof is more than 4 parts by weight, the molecular weight of the polymer is lowered and thus the cohesive force of the adhesive is liable to lower.

For preparing the composition for photopolymerization of the present invention, the monomer mixture of component a) is first mixed with the photopolymerization initiator as component c) and the pre-mixture formed is partially polymerized to form a syrup-form product having a coatable viscosity range of from about 500 to 5,000 centipoises. Alternatively, the pre-mixture of the monomer mixture and the photopolymerization initiator is mixed with a thixotropic agent such as fumed silica to form a coatable syrup-form product. Then, by adding the polyfunctional (meth)acrylate which is component b) as a crosslinking agent and, if necessary, the additional photopolymerization initiator to the coatable syrup-form product, the composition for photopolymerization is prepared. If necessary, to the composition can be added various conventional additives such as a filler, a pigment, an aging inhibitor, a tackifying resin, etc., in the ranges of not hindering the photopolymerization by the irradiation of ultraviolet rays.

In the present invention, the composition thus prepared is irradiated with ultraviolet rays to form a photopolymerized product. The irradiation of ultraviolet rays is carried out in an oxygen-free atmosphere displaced with an inert gas such as a nitrogen gas or in a state of shielding air by coating the composition with an ultraviolet ray-permeable film.

Ultraviolet rays used for the photopolymerization are electromagnetic radiations having a wavelength range of from about 180 to 460 nm, but electromagnetic radiations of wavelengths of longer than or shorter than the above-described wavelength range may be used. As the ultraviolet ray source, an irradiation means such as a mercury arc lamp, a carbon arc lamp, a low-pressure, intermediate-pressure or high-pressure mercury lamp, a metal halide arc, or the like is generally used. The intensity of the ultraviolet rays can be suitably selected by controlling the distance between the light source and an article to be irradiated or by controlling the voltage of the light source, but taking the irradiation time (productivity) into consideration, it is usually desirable to use weak light of from 0.1 to 7 mW/cm$^2$.

The photopolymerization product thus obtained by the irradiation with ultraviolet rays has a sufficiently high molecular weight and also has a high degree of crosslinking such that the content of solvent-insoluble components becomes at least 60% by weight, and preferably from 70 to 95% by weight, by being internal-crosslinked with the crosslinking agent as component b). However, as described above, in the photopolymerization product usually remain from about 1 to 5% by weight of unreacted monomers.

In the present invention, it is an important feature to remove the remaining unreacted monomers by heat-drying to the extent that the content of the remaining monomers becomes less than 5,000 ppm, and preferably less than 3,000 ppm. By reducing the content of the remaining monomers as described above, the occurrence of swelling of the adhered surface and stains with gases and also great lowering of the cohesive force caused by the vaporization of the remaining monomers in using the adhesive at a high temperature can be prevented.

Drying by heating in the present invention is usually carried out using a drying furnace but it is particularly preferred to use a hot air circulating drying furnace having a far infrared heater. This is because the photopolymerized product can be dried with a good efficiency in a short period of time by heating from the inside with the far infrared heater and diffusion of the circulating hot air from the surface. The drying condition depends upon the faculty of the drying furnace but the drying temperature and the drying time are usually from about 100° to 150° C. and from several tens seconds to several minutes, respectively.

The photopolymerization product having solvent-insoluble components of at least 60% by weight and remaining amount of the unreacted monomers of less than 5,000 ppm thus obtained has good tackiness, adhesive strength, and cohesive force, in particular large cohesive force at a high temperature, and can be widely used as an acrylic pressure-sensitive adhesive having an excellent heat resistance for a heat-resistance use of at least 100° C. as a fixing tape for adhering electronic parts and a masking tape in a soldering step.

The adhesive sheet of the present invention is prepared by forming the acrylic heat-resistant adhesive having excellent heat resistance obtained by the above-described method on one or both surfaces of a sheet-form or tape-form backing according to the above-described uses. As the backing, porous materials such as nonwoven fabrics, papers, etc., or plastic films such as polyester films, polyimide films, etc., are used and for heat-resistance uses, heat-resistant backings such as polyimide films, etc., are particularly preferably used.

The thickness of the backing is usually from about 25 to 125 μm and also the thickness of the layer of the acrylic pressure-sensitive adhesive is usually from about 25 to 100 μm.

The production of the adhesive sheet of the present invention can be carried out by forming the layer of the acrylic pressure-sensitive adhesive having a desired thickness on a release liner by the method described above and transferring the adhesive layer onto one or both surfaces of a backing. Alternatively, the adhesive sheet of the present invention may be produced by a method of directly impregnating or coating the backing with the composition for photopolymerization without using a release liner, irradiating the composition with ultraviolet rays to form the photopolymerized product having solvent-insoluble components of at least 60% by weight, and drying the photopolymerized product by heating to reduce the content of the remaining unreacted monomers to less than 5,000 ppm. The above-described method can be properly employed according to the kind of the backing, etc.

As described above, in the present invention, different from the conventional technique wherein the by-production of low molecular materials is inevitable by forcibly increasing the polymerization rate at the photopolymerization, by photopolymerizing the composition at a relatively low irradiation intensity, a photopolymerized product having a high molecular weight and being highly crosslinked can be obtained and also by reducing from about 1 to several percents by weight of unreacted monomers remaining in the photopolymerized product to a slight content of less than 5,000 ppm by heat-drying the photopolymerized product, an acrylic pressure-sensitive adhesive highly satisfying high tackiness, adhesive strength, and cohesive force, in particular, having excellent cohesive force at high temperature, and capable of sufficiently enduring the use in a heat-resistant field can be provided since the adhesive contains less low molecular weight materials and unreacted monomers, which lower the cohesive force, and also contains less unreacted monomers which vaporize in the case of heating at a high temperature, and also an adhesive sheet having formed thereon the above-described adhesive can be provided.

The present invention is described more practically by the following examples, wherein all parts are by weight unless otherwise indicated.

EXAMPLE 1

A pre-mixture was prepared using 60 parts of isononyl acrylate, 28 parts of butyl acrylate, 12 parts of acrylic acid, and 0.05 part of 2,2-dimethoxy-2-phenylacetophenone (Irgacure 651, trade name, made by Ciba-Geigy Corporation) as a photopolymerization initiator by exposing the pre-mixture to ultraviolet rays in a nitrogen gas atmosphere, the pre-mixture was partially polymerized to provide a coatable styrup having a viscosity of about 4,500 centipoises.

To 100 parts of the partially polymerized syrup were added 0.1 part of trimethylolpropane triacrylate as a crosslinking agent and 0.1 part of 2,2-dimethoxy-2-phenylacetophenone as the additional photopolymerization initiator, followed by mixing to provide a composition. The composition was coated on a polyimide film of 25 μm in thickness, and photopolymerized by irradiating the coated composition with ultraviolet rays of 400 mj/cm$^2$ by a high-pressure mercury lamp having an intensity of 5 mW/cm$^2$ under a nitrogen gas atmosphere to form a layer of the photopolymerized product having a thickness of 50 μm.

The content of the remaining monomers in the photopolymerized product was 30,000 ppm. Further, the content of the solvent-insoluble components was 71% by weight.

The polyimide film having formed thereon the layer of the photopolymerized product was placed in a hot air circulating dryer and heat-treated at 130° C. for 5 minutes to remove the remaining monomers in the photopolymerized product to provide a pressure-sensitive adhesive sheet having the layer of the adhesive wherein the content of the remaining monomers was 2,600 ppm.

EXAMPLE 2

A pre-mixture was prepared using 90 parts of 2-ethylhexyl acrylate, 10 parts by weight of acrylic acid, and 0.05 part of Irgacure 651 (the photopolymerization initiator described above). By exposing the pre-mixture to ultraviolet rays in an nitrogen gas atmosphere, the premixture was partially polymerized to provide a coatable syrup having a viscosity of about 5,000 centipoises.

To 100 parts of the partially polymerized syrup were added 1.0 part of 1,6-hexanediol diacrylate as a crosslinking agent and 0.05 part of the additional Irgacure 651 (the above-described photopolymerization initiator), followed by mixing to provide a composition. The composition was coated on a polyimide film of 25 μm in thickness and the coated composition was photopolymerized by irradiating the coated layer with ultraviolet rays of 700 mj/cm$^2$ by a high-pressure mercury lamp having an intensity of 5 mW/cm$^2$ under a nitrogen gas atmosphere to form a layer of the photopolymerized product having a thickness of 50 μm.

The content of the remaining monomers in the photopolymerized product was 17,000 ppm. Further, the content of solvent-insoluble components of the photopolymerized product was 84% by weight.

By treating the polyimide film having formed thereon the layer of the photopolymerized product in a hot air circulating dryer as in Example 1, the remaining monomers in the photopolymerized product was removed to provide an adhesive sheet having formed thereon the layer of the adhesive containing the remaining monomer components of 1,400 ppm.

COMPARISON EXAMPLE 1

By following the same procedure as in Example 1 except that the heat treatment in the hot air circulating dryer was omitted, an adhesive sheet was prepared.

COMPARISON EXAMPLE 2

By following the same procedure as in Example 2 except that the heat treatment in the hot air circulating dryer was omitted, an adhesive sheet was prepared.

COMPARISON EXAMPLE 3

By following the same procedure as in Example 1 except that the amount of trimethylolpropane triacrylate was changed to 0.04 part, an adhesive sheet was prepared.

The solvent-insoluble components in the photopolymerized product were 35% by weight and the content of the remaining monomers after the heat treatment was 2,000 ppm.

COMPARISON EXAMPLE 4

In a flask were placed 90 parts of 2-ethylhexyl acrylate, 10 parts of acrylic acid, 210 parts of toluene, and 0.4 part of benzoyl peroxide, and after sufficiently displacing the inside atmosphere of the flask with a nitrogen gas, the solution polymerization was carried out by stirring under heating to a temperature of from 60 to 80° C. to provide a pressure-sensitive adhesive solution having a viscosity of 120 poises, a polymerization rate of 99.2% by weight, and a solid component content of 31.4% by weight.

After mixing 100 parts of the adhesive solution with 1.5 parts of a polyfunctional isocyanate compound as a crosslinking agent, the mixture was coated on a polyimide film of 25 μm in thickness and dried in a hot air dryer at 130° C. for 5 minutes to provide an adhesive sheet having formed thereon the adhesive layer of 50 μm in thickness.

The solvent-insoluble components in the adhesive layer were 68% by weight, the content of remaining toluene was 800 ppm, and the content of the remaining monomer components was 110 ppm.

COMPARISON EXAMPLE 5

After uniformly mixing with stirring 90 parts of 2-ethylhexyl acrylate, 10 parts of acrylic acid, 0.1 part of Irgacure 651 (the above-described photopolymerization initiator), 0.1 part of 1,6-hexane diacrylate, and 5 parts of acryl rubber, oxygen present dissolved therein was completely removed by displacing the inside of the system with a nitrogen gas to provide a composition having a viscosity of 450 centipoises.

The composition was coated on a polyimide film of 25 μm in thickness and irradiated with ultraviolet ray (wavelength of 360 nm) having an intensity of 5 mW/cm$^2$ for 1 minute in a nitrogen gas atmosphere (1st irradiation stage). In this case, the content of the remaining monomers was 2.8% by weight.

In place of applying a heat treatment, the coated composition was further irradiated with ultraviolet rays using a super-high-pressure mercury lamp of an intensity of 15 mW/cm$^2$ (2nd irradiation stage), and the remaining monomers were polymerized to provide an adhesive sheet. In this case, the amount of the remaining monomers was 1,100 ppm, and the solvent-insoluble components were 74% by weight.

For the sake of comparison, the contents of the remaining monomers, the remaining solvent, and the solvent-insoluble components in the adhesive layers of the adhesive sheets prepared in above Examples 1 and 2 and Comparison Examples 1 to 5 are shown in Table 1 below.

In addition, these measurements were carried out as follows.

Determination of Remaining Volatile Components

From each adhesive sheet, 0.5 g of the pressure-sensitive adhesive was sampled. The sample was immersed in 20 ml of ethyl acetate for 2 days, and after sufficiently extracting the remaining components (monomers or solvent), the extract was analyzed by gas chromatography to determine the residual component(s). The measurement conditions were as follows.

Apparatus: HP-5890A (trade name, manufactured by Hewlett Packard Co.)

Column: 0.25 mm (diameter)×30 m (length)

Measurement Temperature: 250° C.

In addition, the qualitative confirmation of each remaining component was carried out by a mass spectrometric analysis (GC-MS analysis) after the gas chromatographic separation.

Solvent-Insoluble Components

After sampling about 2.0 g of the pressure-sensitive adhesive from each adhesive sheet and precisely weighing the sample, the sample was packed in a precisely weighed filter paper tube and extracted with 150 ml of ethyl acetate using a Soxhlet extractor at a temperature of from 80° to 90° C. for 24 hours. The filter tube was taken out, the weight thereof after drying was measured, and the amount of the solvent-insoluble components was calculated by the following equation.

Solvent-insoluble contents (weight %)=$(A-B)/C \times 100$

A: Weight of the filter paper after drying
B: Weight of the filter paper
C: Weight of the pressure-sensitive adhesive

TABLE 1

|  | Remaining Monomers (ppm) | Remaining Solvent (ppm) | Solvent-Insoluble Components (wt %) |
| --- | --- | --- | --- |
| Example 1 | 2,600 | — | 72 |
| Example 2 | 1,400 | — | 84 |
| Comparison Example 1 | 30,000 | — | 70 |
| Comparison Example 2 | 17,000 | — | 83 |

TABLE 1-continued

|  | Remaining Monomers (ppm) | Remaining Solvent (ppm) | Solvent-Insoluble Components (wt %) |
| --- | --- | --- | --- |
| Comparison Example 3 | 2,000 | — | 35 |
| Comparison Example 4 | 110 | 800 | 68 |
| Comparison Example 5 | 1,100 | — | 74 |

The adhesive sheets prepared in Examples 1 and 2 and Comparison Examples 1 to 5 above were measured for the adhesive strength, the holding force, and the soldering heat resistance by the following manners and the results obtained are shown in Table 2 below.

Adhesive strength

The adhesive strength was measured according to the method of JIS Z-1522 using a stainless steel plate as a material being adhered. The adhesive strength was shown by g/20 mm width.

Holding Force

Each adhesive sheet (10 mm in width) was bonded to one end in lengthwise of a stainless steel plate (30 mm ×120 mm×3.0 mm) having a mirror-plane surface such that the adhered area became 20 mm×10 mm, after allowing to stand the assembly for 30 minutes, a load of 500 g was applied at 100° C., and the time required for falling the adhesive sheet by slipping was measured.

The mark (*) in Table 2 shows that the sample fell by cohesive failure and the mark (↓) shows that the adhesive sheet fell with prints leaving on the surface of the stainless steel plate.

Soldering Heat Resistance

A cut sample of 10 mm×10 mm of each of the adhesive sheets prepared in the above examples and comparison examples was adhered on a stainless steel plate (50 mm×50 mm×0.4 mm) having a mirror-plane surface by means of a hand roller with a great care such that air bubbles did not enter the adhered surface, and after allowing to stand the assembly for 30 minutes at room temperature, the stainless steel plate was treated by floating the adhered sheet above on a molten soft solder bath at 260° C. for 10 seconds (molten soft solder floating test).

The adhered state of each sample sheet after the treatment was visually observed. The presences of foaming of the adhesive and abnormal adhesion (float, creases, peeling, and slipping) were observed and they were evaluated as follows.

TABLE 2

|  | Adhesive Strength (g/20 mm width) | Holding Force at 100° C. (min) | Soldering Heat-Resistance (A) | (B) |
| --- | --- | --- | --- | --- |
| Example 1 | 830 | >500 | ○ | ○ |
| Example 2 | 790 | >500 | ○ | ○ |
| Comparison Example 1 | 920 | *7 | x | x |
| Comparison Example 2 | 840 | *35 | Δ | Δ |
| Comparison Example 3 | 950 | *3 | ○ | x |
| Comparison Example 4 | 1,010 | *10 | x | x |

TABLE 2-continued

| | Adhesive Strength (g/20 mm width) | Holding Force at 100° C. (min) | Soldering Heat-Resistance (A) | (B) |
|---|---|---|---|---|
| Comparison Example 5 | 820 | ↓7 | ○ | Δ |

(A): Foaming
(B): Abnormal adhesion.
○: No change, no abnormal
Δ: Changed little, abnormal found
x: Greatly changed, abnormal found.

As is clear from the results shown in Table 1 and Table 2 described above, it can be seen that the adhesive sheets obtained in Examples 1 and 2, wherein the contents of the solvent-insoluble components and the remaining monomers are in the specific ranges defined by the present invention have a good adhesive strength as well as are excellent in heat-resisting holding property at a high temperature and have an excellent heat resistance capable of enduring a molten soft solder bath floating test.

While the invention has been described in detail and with reference to specific embodiments thereof, it will be apparent to one skilled in the art that various changes and modifications can be made therein without departing from the spirits and scope thereof.

What is claimed is:

1. A pressure-sensitive adhesive having excellent heat resistance at temperatures of 100° C. to 260° C., comprising a photopolymerization product of a composition comprising:

a) 100 parts by weight of a monomer mixture comprising from 70 to 100% by weight of a (meth)acrylic acid alkyl ester having from 2 to 14 carbon atoms in the alkyl moiety and from 30 to 0% by weight of a monoethylenically unsaturated monomer copolymerizable with the (meth)acrylic acid alkyl ester, b) from 0.02 to 5 parts by weight of a poly-functional (meth)acrylate) as a crosslinking agent, and c) from 0.01 to 4 parts by weight of a photopolymerization initiator, wherein said photopolymerization product has been heat dried in the absence of a low boiling organic solvent after photopolymerization and comprises solvent-insoluble components in an amount of at least 60% by weight and unreacted monomers in an amount of less than 5,000 ppm.

2. A pressure-sensitive adhesive as claimed in claim 1, wherein the (meth)acrylic acid alkyl ester is a monofunctional unsaturated (meth)acrylate of a non-tertiary alkyl alcohol.

3. A pressure-sensitive adhesive as claimed in claim 1, wherein the (meth)acrylic acid alkyl ester is at least one member selected from the group consisting of ethyl (meth)acrylate, butyl (meth)acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate and dodecyl (meth)acrylate.

4. A pressure-sensitive adhesive as claimed in claim 1, wherein the monoethylenically unsaturated monomer is at least one member selected from the group consisting of acrylic acid, iraconic acid, sulfopropyl acrylate, hydroxyalkyl acrylate, cyanoalkyl acrylate, acrylamide, substituted acrylamide, N-vinylcaprolactam, acrylonitrile, 2-methoxyethyl acrylate, glycidyl acrylate and vinyl acetate.

5. A pressure-sensitive adhesive as claimed in claim 1, wherein the amount of the (meth)acrylic acid alkyl ester is from 85 to 95% weight, and the amount of the monoethylenically unsaturated monomer is from 15 to 5% by weight.

6. A pressure-sensitive adhesive as claimed in claim 1, wherein the polyfunctional (meth)acrylate is selected from the group consisting of trimethylolpropane tri(meth)acrylate, pentaerythritol tetra(meth)acrylate, 1,2-ethyleneglycol di(meth)acrylate, and 1,6-hexanediol di(meth)acrylate.

7. A pressure-sensitive adhesive as claimed in claim 1, wherein the amount of the polyfunctional (meth)acrylate is from 0.1 to 3 parts by weight.

8. A pressure-sensitive adhesive as claimed in claim 1, wherein the photopolymerization initiator is selected from the group consisting of unsubstituted benzoin ethers, substituted benzoin ethers, substituted acetophenones, substituted α-ketols, aromatic sulfonyl chlorides and photoactive oximes.

9. A pressure-sensitive adhesive as claimed in claim 1, wherein the amount of the photopolymerization initiator is from 0.05 to 1 parts by weight.

10. A pressure-sensitive adhesive as claimed in claim 1, wherein the content of the solvent-insoluble components is from 70 to 95% by weight.

11. A pressure-sensitive adhesive as claimed in claim 1, wherein the remaining amount of the unreacted monomers is less than 3,000 ppm.

* * * * *